| United States Patent [19] | [11] Patent Number: 4,532,283 |
| Liu | [45] Date of Patent: Jul. 30, 1985 |

[54] AROMATIC CARBONATE POLYMER COMPOSITION

[75] Inventor: Ping Y. Liu, Naperville, Ill.

[73] Assignee: General Electric Company, Mt. Vernon, Ind.

[21] Appl. No.: 421,787

[22] Filed: Sep. 23, 1982

[51] Int. Cl.³ .......................... C08K 7/02; C08K 5/42; C08L 53/02; C08L 69/00
[52] U.S. Cl. .................................. 524/166; 524/161; 524/505; 525/92; 525/146
[58] Field of Search .................. 525/92, 146; 524/505, 524/101, 166

[56] References Cited

U.S. PATENT DOCUMENTS

| 3,239,582 | 3/1966 | Keskkula et al. | 525/148 |
| 4,081,424 | 3/1978 | Gergen et al. | 525/148 |
| 4,088,711 | 5/1978 | Gergen et al. | 525/148 |
| 4,218,545 | 8/1980 | Serini et al. | 525/92 |
| 4,263,201 | 4/1981 | Mark et al. | 525/148 |

FOREIGN PATENT DOCUMENTS

EP0028753 5/1981 Fed. Rep. of Germany .

*Primary Examiner*—Allan M. Lieberman
*Attorney, Agent, or Firm*—Martin B. Barancik

[57] ABSTRACT

A composition with increased resistance to environmental stress cracking and crazing comprising a blend of (a) an aromatic carbonate polymer resin and (b) an effective amount of a coupled resin block copolymer of polymerized vinyl aromatic units connected to polymerized diene units.

11 Claims, No Drawings

AROMATIC CARBONATE POLYMER COMPOSITION

BACKGROUND OF THE INVENTION

This invention relates to thermoplastic resin compositions and more particularly is concerned with polycarbonate resin mixtures having improved impact strength, especially in thick sections, and good resistance to environmental stress crazing and cracking.

Aromatic carbonate polymers are well known commercially available materials having a variety of applications in the plastics art. Such carbonate polymers may be prepared by reacting a dihydric phenol, such as 2,2-bis(4-hydroxyphenol)propane, with a carbonate precursor, such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have a high tensile and impact strength, (except in thick molded sections), and a dimensional stability surpassing that of other thermoplastic materials. However, in certain applications, the use of aromatic polycarbonate resins is limited because they exhibit severe environmental stress crazing and cracking. "Environmental stress crazing and cracking" refers to the type of failure which is hastened by the presence of organic solvents such as, for example, gasoline, particularly high octane no-lead gasoline, acetone, heptane and carbon tetrachloride when such solvents are in contact with stressed parts fabricated from aromatic polycarbonate resins. The most significant effect is a loss in vital impact strength and also an increase in brittle-type failure. Contact with such solvents may occur, for example, when parts are used under the hood of automobiles, or near the gasoline filler ports thereof, or when solvents are used to clean or degrease stressed parts made from polycarbonate resins.

At present, no entirely satisfactory means is available for reducing environmental stress crazing and cracking of polycarbonate resins, although a variety of methods have been proposed.

Blends of aromatic polycarbonate with butadiene styrene and polyolefins are disclosed in European Patent Application No. 28753, laid open May 20, 1981. Among the properties disclosed for the blends is reduced sensitivity to stress cracking. General proportions of blend constituents are 80–96.5 weight percent aromatic polycarbonate, 1–10 weight percent polyolefin and 2.5–10 weight percent butadiene styrene polymer containing 30–90% butadiene or a graft copolymer of 80–10% mixture of 50–100% styrene and 0–50% acrylonitrile on 90–0 percent polybutadiene.

U.S. Pat. No. 3,239,582 discloses blends of 95 to 80 weight percent polycarbonate and 5 to 20 weight percent of an alkenylaromatic polymer or copolymer. The term "alkenyl aromatic" is defined and exemplified at column 2, lines 10–47. The blends were disclosed as having an improved melt viscosity compared with polycarbonate itself. No mention of improved resistance to stress cracking is made.

Still other modifiers have been proposed for impact strength improvement, but none of them provides optimum environmental stress crazing and cracking resistance—applicant's earlier filed commonly assigned U.S. patent applications, Ser. No. 238,643, filed Feb. 26, 1981, now abandoned; Ser. No. 343,949; filed Feb. 29, 1982, now U.S. Pat. No. 4,430,476; and Ser. No. 352,382, filed Feb. 25, 1982, now U.S. Pat. No. 4,444,949. Ser. Nos. 238,643 and 352,382 describe polycarbonates modified with a combination of a butadienestyrene block type copolymer, an acrylate core shell interpolymer and, optionally, an olefin/acrylate copolymer. Such compositions process well and are toughened, but there is no disclosure of significant solvent resistance and, as will be shown later herein, by themselves, the block type copolymers do not provide significant resistance to environmental stress crazing and cracking at relatively low and moderate levels, even in thin sections. Ser. No. 343,949 describes polycarbonate resins modified with a combination of the block type copolymers and a linear low density polyolefin resin. There is no mention that such modifier combinations will provide enhanced resistance to environmental stress crazing and cracking.

SUMMARY OF THE INVENTION

Unexpectedly in view of the foregoing, it has now been discovered that polycarbonate resins are rendered more resistant to environmental stress cracking and crazing by incorporating therewith certain quantities of a coupled resinous block copolymer having blocks comprising polymerized vinyl aromatic units connected to blocks comprising polymerized diene units.

DETAILED DESCRIPTION OF THE INVENTION

In accordance with the invention, there is a composition comprising a blend of (a) an aromatic carbonate polymer resin and (b) an amount of coupled resinous block copolymer having blocks comprising polymerized vinyl aromatic units connected to blocks comprising polymerized diene units which imparts to the blend a resistance to environmental stress cracking and crazing greater than that possessed by the said aromatic carbonate polymer.

The amount of diene-vinyl aromatic polymer to be employed varies widely but the minimum amount is any quantity which significantly increases the resistance of aromatic carbonate polymer to environmental stress cracking and crazing, particularly that caused by high aromatic no-lead gasoline to aromatic carbonate polymer article under stress and then measured by an impact test. Clearly, this minimum amount will vary somewhat depending upon the specific diene-vinyl aromatic polymer and aromatic carbonate polymer employed. However, in general, a minimum amount of about 10 weight percent of diene-vinyl aromatic should be present in the blend, the percentage based on the sum of the aromatic carbonate polymer and the diene-vinyl aromatic polymer. As long as the resistance to environmental stress crazing and cracking of the aromatic carbonate polymer article is significantly enhanced, larger quantities of diene-vinyl aromatic may be employed. The practical upper limit of diene-vinyl aromatic polymer is that quantity which allows the aromatic carbonate polymer to retain a significant number and proportion of its desirable properties. Generally, depending upon the specific aromatic carbonate polymer and diene-vinyl aromatic employed, a maximum amount of about 50 weight percent of diene-vinyl aromatic polymer can be employed. A range of from about 13 to about 35 weight percent of diene-vinyl aromatic in the blend is preferred.

Such addition may be accomplished in any manner so long as a thorough distribution of the modifier in the polycarbonate resin is obtained. For example, the mixing of materials may be accomplished by a variety of methods normally employed for incorporation of plasticizers or fillers into thermoplastic polymers including but not limited to mixing rolls, doughmixers, Banbury mixers, extruders, and other mixing equipment. The resulting mixtures may be handled in any conventional manner employed for the fabrication or manipulation of thermoplastic resins. The materials may be formed or molded using compression, injection, calendering, extrusion and blow molding techniques, alone or in any combination. Also, multiprocessing methods, such as extrusion-blow molding or coextrusionco-injection, can be used, e.g., for multi-layer containers. It should be understood that the aromatic carbonate polymer resin mixtures prepared in accordance with the invention may also contain, in addition to the above-mentioned polymers, other additives to lubricate, reinforce, prevent oxidation, thermally stabilize or lend color to the material. Other additives such as mold release agents and flame retardant agents, particularly the metal salts of various organic sulfonic acids, are well known in the art, and may be incorporated without departing from the scope of the invention.

The aromatic carbonate polymers (a) used to provide mixtures of the present invention may be prepared by reacting a dihydric phenol with a carbonate precursor, such as phosgene, a haloformate or a carbonate ester. Generally speaking, such carbonate polymers may be typified as possessing recurring structural units of the formula:

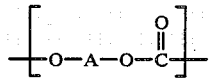

wherein A is a divalent aromatic radical of the dihydric phenol employed in the polymer producing reaction. Preferably, the aromatic carbonate polymers used to provide the resinous mixtures of the invention have an intrinsic viscosity (as measured in methylene chloride at 25° C.) ranging from about 0.35 to about 0.75 dl./g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether;
and the like.

A variety of additional dihydric phenols which may be employed to provide such carbonate polymers are disclosed in commonly assigned Goldberg, U.S. Pat. No. 2,999,835. It is, of course, possible to employ two or more different dihydric phenols or a dihydric phenol in combination with a glycol, a hydroxy terminated polyester, or a dibasic acid in the event that a carbonate copolymer rather than a homopolymer is desired for use in the preparation of the polycarbonate mixtures of the invention. Branched polycarbonates are also useful. To avoid unnecessarily detailed description, the disclosures of U.S. Pat. Nos. 3,028,365; 3,334,154; 4,001,184; 4,131,575; are incorporated herein by reference. In any event, the preferred aromatic carbonate polymer is a homopolymer derived from 2,2-bis(4-hydroxyphenyl)-propane (bisphenol-A).

Copolymer component "b" of the blend in accordance with this invention comprises a coupled resinous block copolymer having blocks comprising polymerized vinyl aromatic units connected to blocks comprising polymerized diene units. Examples of vinyl aromatic units include styrene, alpha-methylstyrene, vinyl toluene, para-methylstyrene and the like. The preferred unit is styrene. Examples of diene units include butadiene, isoprene, 1,3-pentadiene, 2,3-dimethylbutadiene and the like. Thus the preferred "b" component of the blend is a copolymer of polymerized butadiene and styrene units.

The butadiene portion, based on the total weight of the copolymer can range from about 15 to about 40 weight percent. The styrene portion can range from about 60 to about 85 weight percent. In especially preferred butadiene styrene copolymers, the weight ratio of the styrene fraction to the butadiene fraction ranges from about 2 to 1 to about 3 to 1. The residual dienic unsaturation can be partially or essentially removed by selective hydrogenation if desired. The copolymers may be made by procedures well known to those skilled in the art. A suitable commercial material is Phillips Petroleum K-Resin KRO3 BDS polymer. This has a styrene-butadiene weight ratio of about 3:1 and a density of the order of about 1.01 g/cm$^3$, see U.S. Pat. Nos. 3,639,517 and 4,091,053 incorporated by reference herein.

The resistance to environmental stress crazing and cracking of the polycarbonate resin mixtures prepared in accordance with the invention was determined by subjecting stressed specimens to gasoline soaking and then measuring their impact strengths with special attention to the mode of failure, ductile failure being preferable. The specimens are ASTM D-256 impact test bars of two sizes: $2\frac{1}{2}''\times\frac{1}{2}''\times\frac{1}{8}''$ and $2\frac{1}{2}''\times\frac{1}{2}''\times\frac{1}{4}''$. Values of the desired stress were applied to each test bar by mounting on an ASTM stress jig (1 percent strain). The mounted bars were soaked 24 hours at room temperature in AMOCO ® unleaded premium grade gasoline. They were then removed from the jig, the gasoline evaporated and the bars dried for 24 hours. Izod impact strengths were then determined according to ASTM D256 procedures on notched specimens. In all cases, the properties are compared with those of identical unsoaked, molded mixtures. Those which retain a substantial amount of impact resistance after soaking obviously are the best at resisting environmental stress cracking.

DESCRIPTION OF THE PREFERRED EMBODIMENTS

In order that those skilled in the art may better understand how the present invention may be practiced, the following examples are given by way of illustration and not by way of limitation. All parts and percentages are by weight unless otherwise noted. The various polycarbonate resin mixtures were molded into the test specimens in a 3 oz. Van Dorn injection molding machine. The temperatures used were 270° C. on the cylinder and nozzle with a range of from 265° C. to 285° C.

EXAMPLES 1 and 2

An aromatic polycarbonate derived from 2,2-bis(4-hydroxyphenyl)propane and having an intrinsic viscosity (I.V.) in the range of from about 0.46 to about 0.49 dl/g as determined in methylene chloride solution at 25° C. was mixed with a butadiene-styrene polymer (Phillips Petroleum KR-03, hereinafter referred to as BDS), said copolymer having a weight ratio of styrene to butadiene of about 3:1. The ingredients were then blended together by mechanically mixing them in a laboratory tumbler and the resulting mixtures were fed to an extruder which was operated at about 255° C. The resulting extrudates were comminuted into pellets. The pellets were injection molded at about 265° C. to about 285° C. into test specimens of about $2\frac{1}{2}''\times\frac{1}{2}''\times\frac{1}{4}''$ and $2\frac{1}{2}''\times\frac{1}{2}''\times\frac{1}{8}''$, the latter dimension being specimen thickness. Some of the specimens were mounted on an ASTM stress jig (1% strain) and soaked in AMOCO ® premium unleaded gasoline for 24 hours. They were removed from the jig, the gasoline allowed to evaporate at room temperature for 24 hours, and then they were tested. Where indicated, Izod impact strengths of these specimens were measured according to the noticed Izod test, ASTM D256, and are set forth in Table I. The superscript refers to the percent ductility at the foot/lb. value. The samples labeled control was the bisphenol A polycarbonate, unmodified, or modified as indicated. The formulations used, and the results obtained are set forth in Table I:

TABLE I

| POLYCARBONATE MODIFIED WITH BUTADIENE STYRENE COPOLYMER | | | | | |
|---|---|---|---|---|---|
| EXAMPLE | A* | B* | C* | 1 | 2 |
| Composition (pbw) Polycarbonate | 100 | 95.7 | 94.3 | 80 | 84 |
| BD-S Copolymer | — | 4.3 | 5.7 | 20 | 16 |
| PROPERTIES | | | | | |
| Notched Impact Strength | | | | | |
| $\frac{1}{8}''$ ft. lb. in. | 14.8 | 15.2 | 14.3 | 13.8 | 13.6 |
| $\frac{1}{4}''$ ft. lb. in. | 1.6⁰ | 8.9⁶⁰ | 11.2 | 10.4 | 10.5 |
| SOAKED IN GASOLINE | | | | | |
| Notched Impact Strength | | | | | |
| $\frac{1}{8}''$ ft. lb. in. | broke | 0.5⁰ | 1.0⁰ | 13.3 | 13.6 |
| $\frac{1}{4}''$ ft. lb. in. | — | — | — | 10.4 | 4.5 |

*Control
Unless otherwise specified by superscript all were ductile at failure.

As is observed from the above data, the polycarbonate alone has no resistance to gasoline under the test conditions. Those examples with relatively small quantities of butadiene-styrene, B and C, show virtually no improvement in resistance to gasoline and a brittle failure mode. However those examples with substantially increased quantities of butadiene-styrene, 1 and 2, show substantially increased resistance to gasoline and a ductile failure mode. In fact, Example 1 shows a *complete* retainment of impact properties and ductile failure mode under the test conditions.

What is claimed is:

1. A composition comprising a blend of
   (a) an aromatic carbonate polymer resin derived from a carbonate precursor and a dihydric phenol, said dihydric phenol being unsubstituted on its aryl grouping or groupings and
   (b) from about 10 to about 50 weight percent of coupled resinous block copolymer having blocks comprising polymerized vinyl aromatic units connected to blocks comprising polymerized diene units; the residual dienic unsaturation being essentially non-hydrogenated, and said 10 to about 50 weight percent of copolymer imparting to the blend a resistance to environmental stress cracking and crazing greater than that possessed by the said aromatic carbonate polymer, the amount of copolymer based upon the weight of copolymer and aromatic carbonate polymer.

2. A composition in accordance with claim 1 wherein A is derived from bisphenol-A.

3. A composition in accordance with claims 1 or 2 wherein "b" copolymer comprises polymerized styrene units and polymerized butadiene units.

4. A composition in accordance with claims 1 or 2 wherein "b" copolymer comprises polymerized styrene units and polymerized butadiene units and is present in quantities of from about 13 to 35 weight percent.

5. A composition in accordance with claims 1 or 2 wherein a reinforcing amount of a filler is present.

6. A composition in accordance with claims 1 or 2 wherein a reinforcing amount of a glass fiber is present.

7. A composition in accordance with claims 1 or 2 wherein a flame retardant effective amount of a metal salt of an organic sulfonic acid is present.

8. A composition in accordance with claim 1 wherein the polymerized dienic units are from about 15 to about 40 weight percent of the "b" copolymer and the vinyl aromatic units are from about 60 to 85 weight percent of the "b" copolymer.

9. A composition in accordance with claim 8 wherein the "b" copolymer is from about 13 to 35 weight percent.

10. A composition in accordance with claim 2 wherein the "b" copolymer is from about 13 to 35 weight percent.

11. A composition in accordance with claim 10 wherein the polymerized diene units are butadiene units and are from about 15 to 40 weight percent of the copolymer and the polymerized vinyl aromatic units are styrene units and are from about 60 to 85 weight percent of the copolymer.

* * * * *